United States Patent [19]

Rossi et al.

[11] Patent Number: 4,588,539

[45] Date of Patent: May 13, 1986

[54] PROCESS AND PRESS WITH A CONTROLLED PRESSURE SYSTEM

[75] Inventors: Alfred F. Rossi, Wyckoff; Albert D. Johns, Roselle Park; Walter Malakhow, Teaneck, all of N.J.; George W. Michalec, Pleasantville, N.Y.

[73] Assignee: James River Corporation of Virginia, Norwalk, Conn.

[21] Appl. No.: 697,888

[22] Filed: Feb. 4, 1985

[51] Int. Cl.⁴ .............................................. B29C 17/00

[52] U.S. Cl. .................................. 264/40.5; 264/320; 425/167; 425/340; 425/343; 425/344; 425/398; 425/419; 425/451.2

[58] Field of Search ............... 425/149, 167, 352, 355, 425/340, 343, 344, 346, 383, 394, 398, 406, 419, 451.2; 264/40.5, 320

[56] References Cited

U.S. PATENT DOCUMENTS

| | | | |
|---|---|---|---|
| 2,377,351 | 6/1945 | Martin | 425/394 |
| 2,377,599 | 6/1945 | Allen | 425/394 |
| 2,568,698 | 9/1951 | Amberg | 425/355 |
| 3,054,144 | 9/1962 | Goodwin et al. | 425/396 X |
| 3,089,188 | 5/1963 | Hoffmann | 425/394 X |
| 3,324,511 | 6/1967 | Micai et al. | 425/398 |
| 3,343,217 | 9/1967 | Daubenberger | 425/394 |
| 3,446,879 | 5/1969 | Atkin | 425/394 X |
| 3,570,060 | 3/1971 | Stephenson | 425/406 X |
| 3,647,332 | 3/1972 | Schmaus | 425/344 X |
| 3,825,384 | 7/1974 | Hehl | 425/451.2 X |
| 3,890,413 | 6/1975 | Peterson | 425/344 X |
| 4,000,231 | 12/1976 | Peterson | 425/344 X |
| 4,057,380 | 11/1977 | Hosoe | 425/398 X |
| 4,147,486 | 4/1979 | Jahnle | 425/394 X |
| 4,170,621 | 10/1979 | Kiefer | 425/394 X |
| 4,269,580 | 5/1981 | Wright | 425/406 X |
| 4,480,982 | 11/1984 | Sexstone et al. | 425/406 X |
| 4,509,909 | 4/1985 | Arends | 425/398 X |
| 4,514,353 | 4/1985 | Alexander et al. | 425/398 X |
| 4,533,313 | 8/1985 | Poncet | 425/406 X |
| 4,534,725 | 8/1985 | Hemmelgarn et al. | 425/394 |

*Primary Examiner*—J. Howard Flint, Jr.
*Attorney, Agent, or Firm*—Finnegan, Henderson, Farabow, Garrett & Dunner

[57] ABSTRACT

A press for forming sheet material into a shaped article comprising a frame, first and second complementary dies, a cam supported by the frame for reciprocally moving the first die along an axis between a first position axially spaced from the second die and a second position fully mated with the second die, the cam including a dwell period when the first die is in the second position. The press includes a bolster supporting the second die for axial movement between upper and lower limits, the bolster being axially spaced from the upper limit by movement of the first die to the second position. The press also includes a hydraulic power circuit responsive to the position of the cam for normally biasing the bolster toward its upper limit under a first hydraulic pressure and for biasing the bolster toward the upper limit under a second hydraulic pressure during the dwell period, the second hydraulic pressure being greater than the first hydraulic pressure.

26 Claims, 5 Drawing Figures

PROCESS AND PRESS WITH A CONTROLLED PRESSURE SYSTEM

BACKGROUND OF THE INVENTION

1. Field of the Invention

The invention relates to a press and, in particular, a press incorporating separate, defined, selectable pressure stages.

2. Description of the Related Art

Known presses for forming articles from material generally comprise two opposed working surfaces, one of which reciprocally moves between positions spaced from and in pressing contact with the other surface. Pressure is generated between the working surface by a pressing force acting on the one surface being opposed by either a relatively rigid support for the other surface or a counter force acting on the other surface.

Since presses in which the other surface is rigidly supported are relatively inefficient due to the work loss and require substantial strength to support the pressure involved without substantial press deflection, many modern presses incorporate a means for imposing a counter force on the other surface. This is particularly the case where the material being pressed is relatively soft or easy to shape. Presses for such material, such as paper, require a counter force which cooperates with the pressing force to gradually reach the desired pressure acting on the material.

In many such presses the counter force is provided by compression springs, called bolster springs, which support the other surface. The bolster springs resist the pressing force and determine the pressure imposed between the working surfaces. Such presses are shown in U.S. Pat. Nos. 2,377,599 and 3,054,144. A press of this type commonly used for producing paperboard products is the Peerless Forming Machine sold by the Peerless Machine & Tool Corporation.

The known presses using bolster springs have certain disadvantages, particularly where they are used to form paperboard products. One disadvantage is the inability to control when maximum pressure is applied by the bolster springs. In most known presses for paperboard where the working surfaces are complementary dies, as the dies approach complete mating, the spring-generated pressure rises rapidly, often imposing excessive forming pressure before the die mating action has had an opportunity to shape the article. If pressure is fully applied before the paperboard has achieved the required shape, subsequent shaping by the dies will tear the paperboard.

Other disadvantages of spring operated presses include the load imposed by the springs on the press motor necessitating use of higher capacity motors. Moreover, where bolster springs are used, it is difficult and time-consuming to change the forming pressure as product or process changes occur causing significant press down time.

Most known presses provide several pairs of cooperating dies for production of several formed articles for each press cycle. In such presses, each die pair has its own set of bolster springs providing forming pressure. In these multiple across configurations, forming pressure may vary between die pairs anywhere from 30 to 85 percent. Such variation produces articles of varying rigidity and quality. A variety of factors contribute to the undesirable product variation including different spring rates, spring lengths, die setups, and press deflections.

The invention overcomes these and other disadvantages of the prior presses. The press of the invention incorporates a forming system having means for controlling and changing the pressure between the working surfaces during a press cycle. In particular, the invention includes a system permitting selection of two or more counter forces which are applied to the other surface at predetermined times during a press cycle. For example, in a press for forming paperboard articles, the invention provides a dual pressure counter force, a first pressure for shaping the article and a second greater pressure for forming the article.

The dual pressure aspect of the invention provides two advantages. First, since only lower pressure is applied until the dies are fully mated and, therefore, the article has been fully shaped, the tearing of the article which occurs in prior presses is eliminated. Second, the dual pressure eliminates motor overload because high pressure is applied only after the dies are fully mated. When the motor drives a cam, high pressure is applied only during cam dwell and torque transmitted back to the motor is zero.

As each die pair is biased together by a hydraulic cylinder receiving pressurized fluid from a common source, all die pairs in a multiple across die configuration are subjected to the same pressures resulting in consistently uniform product. Moreover, required changes in shaping or forming pressure may be effected with each by merely adjusting the common hydraulic source pressure.

Additional advantages of the invention are set forth in part in the description which follows, and in part will be obvious from the description, or may be learned by practice of the invention.

SUMMARY OF THE INVENTION

The objects and advantages of the invention may be realized and attained by means of the instrumentalities and combinations particularly pointed out in the appended claims.

The invention is a press comprising a pair of opposed working surfaces, means for cyclically moving one surface between positions spaced from and in pressing contact with the other surface, means for limiting the movement of the other surface, means for biasing the other surface toward the one surface under a predetermined force, and means for cyclically changed the magnitude of the predetermined force between controlled, predetermined levels during each cycle of the moving means.

Preferably, the biasing means comprises a hydraulic cylinder and the changing means comprises control means response to the moving means for normally conducting hydraulic fluid at a first pressure to the hydraulic cylinder and for conducting hydraulic fluid at a second pressure to the cylinder when the surfaces are in pressing contact.

The invention is also directed to a pess comprising a frame; a plurality of pairs of opposed first and second working surfaces, each first surface being supported by the frame for axial movement between a first position spaced from and a second position in pressing contact with a respective second surface and each second surface being supported by the frame for independent axial movement between upper and lower limits; means supported by the frame for cyclically moving each first surface and for imposing a predetermined pressing force on each respective second surface when the first surface is in pressing contact, means for biasing each second surface towrad its respective first surface under a predetermined counter force in axial opposition to the pressing force; means for compensating for frame deflection at each pair of surfaces caused by the opposed pressing and counter forces; and means for cyclically changing the magnitude of the counter force between controlled predetermined levels during each cycle of the moving means.

Preferably, the biasing means comprises a plurality of hydraulic cylinders each having a cylinder rod operatively engaging a respective one of the second surfaces and the changing means comprises control means responsive to the moving means for normally conducting fluid at a first pressure to the hydraulic cylinders and for conducting fluid at a second pressure to the hydraulic cylinders when the surfaces are in pressing contact.

It is also preferred that the compensating means comprise a stroke length for each hydraulic cylinder greater than that necessary to bias the respective second surface against its upper limit.

The invention also is directed to a press for forming sheet material into a shaped article, the press comprising a frame; first and second complementary dies; cam means supported by the frame for reciprocally moving the first die along an axis between a first position axially spaced from the second die and a second position fully mated with the second die, the cam means including a dwell period when the first die is in the second position; bolster means supporting the second die for axial movement between upper and lower limits, the bolster means being axially displaced from the upper limit by movement of the first die to its second position; and hydraulically actuated power means responsive to the position of the cam means for normally biasing the bolster means toward the upper limit under a first hdyraulic pressure and for biasing the bolster means toward the upper limit under a second hydraulic pressure during the dwell period, the second hydraulic pressure being greater than the first hydraulic pressure.

Preferably, the bolster means comprises a bolster plate supporting the second die on one surface thereof and including a plurality of pressure pins secured to and axially depending from the other surface of the bolster plate.

In the preferred embodiment, the power means comprises a hydraulic cylinder including a clyinder rod responsive to the first and second hydraulic pressure; means for transmitting the pressure imposed on the rod to the pressure pin; means for compensating for misalignment between the cylinder and the pressure pins; and control means responsive to the position of the cam means for normally conveying hydraulic fluid at the first pressure to the hydraulic cylinder and for conveying hydraulic fluid at the second pressure to the hydraulic cylinder during the dwell period.

The transmitting means preferably comprises a yoke attached at one side thereof to the cylinder rod for axial movement therewith and engaging at the other side thereof the pressure pins. The compensating means comprises a spherical rod end on the end of the cylinder rod engaging the one side of the yoke, a clevis bracket and pivot pin pivotally attaching the cylinder rod to the yoke and a plurality of concave depressions disposed on the other side of the yoke for cooperating with complementary convex ends of the pressure pins.

Preferably, the control means comprises a source of pressurized hydraulic fluid, first means for selectively limiting the pressure of the hydraulic fluid to the first pressure, second means for selectively limiting the pressure of the hydraulic fluid to the second pressure, electrically operated directional valve means for selectively conveying the first or second pressure to the hydraulic cylinder and means for sensing the position of the cam means and for operating the valve means to convey the second pressure to the hydraulic cylinder when the cam means is in the dwell period.

The invention also is directed to a method for forming a shaped article from sheet material, the method comprising the steps of providing a first die for reciprocal axial movement between first and second positions; providing a second die complementary and axially opposed to the first die for axial movement between upper and lower limits; applying a first perdetermined hydraulic pressure to the second die to bias the second die toward the upper limit; disposing the sheet material between the first and second die; axially moving the first die from the first position spaced from the second die to the second position mated with the second die by a force sufficient to axially move the second die from its upper limit when the first die achieves its second position; maintaining the first die in the second position for a predetermined period; while the first die is in the second position, applying a second predetermined hydraulic pressure to the second die to bias the second die toward the upper limit, the second pressure being greater than the first pressure; axially moving the first die from the second position to the first position; removing the second hydraulic pressure from and applying the first hydraulic pressure to the second die; and removing the shaped article.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENTS

Figure 1:
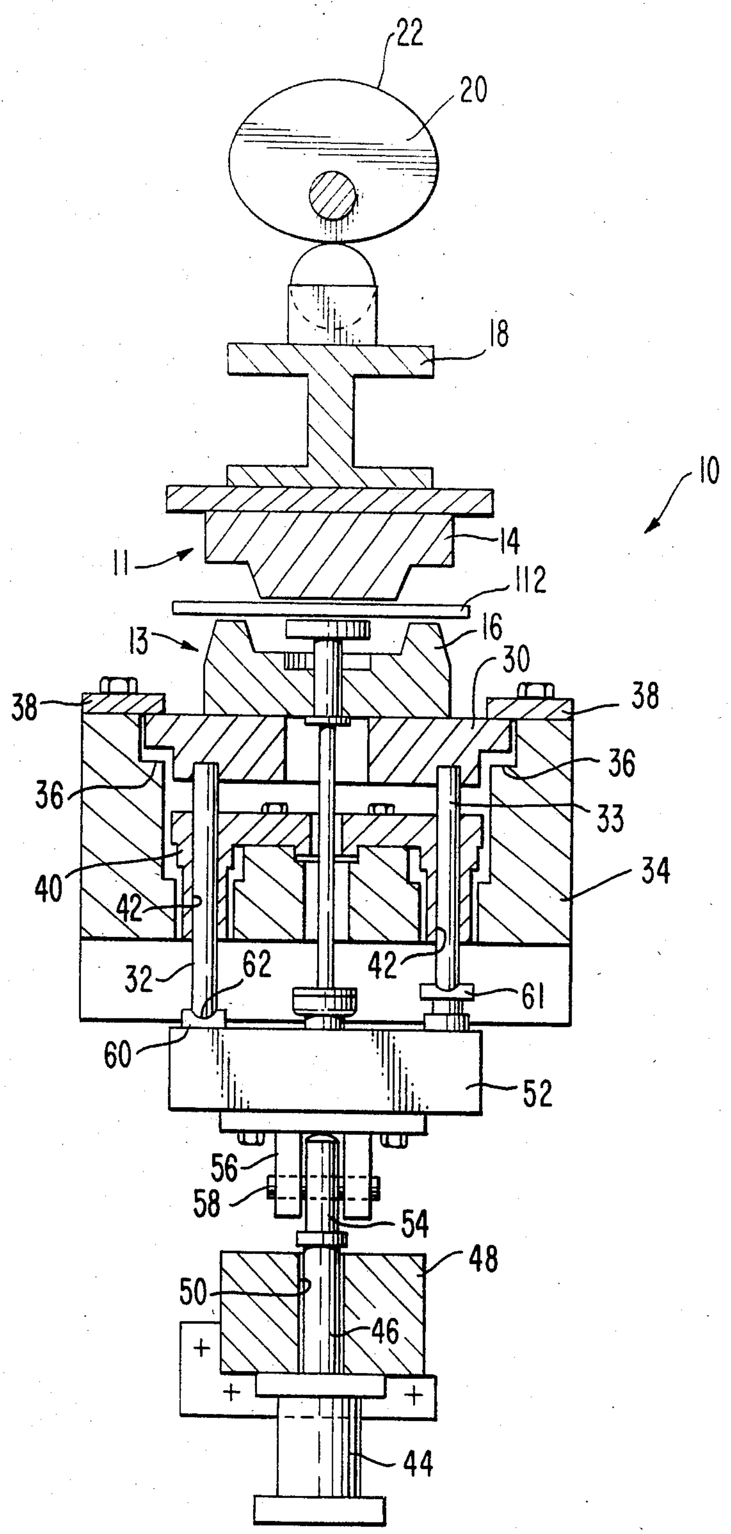
FIG. 1 is a cross-sectional view of an embodiment of the invention taken along lines I—I in FIG. 2.

Reference will now be made in detail to the present preferred embodiments of the invention, examples of which are illustrated in the accompanying drawings.

In accordance with the invention, a press comprises a pair of opposed working surfaces and means for cyclically moving one surface between positions spaced from and in pressing contact with the other surface. In the embodiment depicted in the drawings, FIGS. 1 and 4, wherein like components have the same numbers, the press 10 comprises a pair of opposed working surfaces 11 and 13, which in the depicted preferred embodiment are complementary dies 14, 16.

In the embodiment, the moving means comprises ram 18 carrying one working surface 11 and operatively engaged by rotating cam 20 for cyclically moving surface 11 between positions spaced from and in pressing contact with surface 13.

In accordance with another embodiment of the invention, a press for forming sheet material into a shaped article comprises a frame, first and second complementary dies, and cam means supported by the frame for reciprocally moving the first die along an axis between a first position axially spaced from the second die and a second position fully mated with the second die, the cam means including a dwell period when the first die is in the second position.

Figure 2:
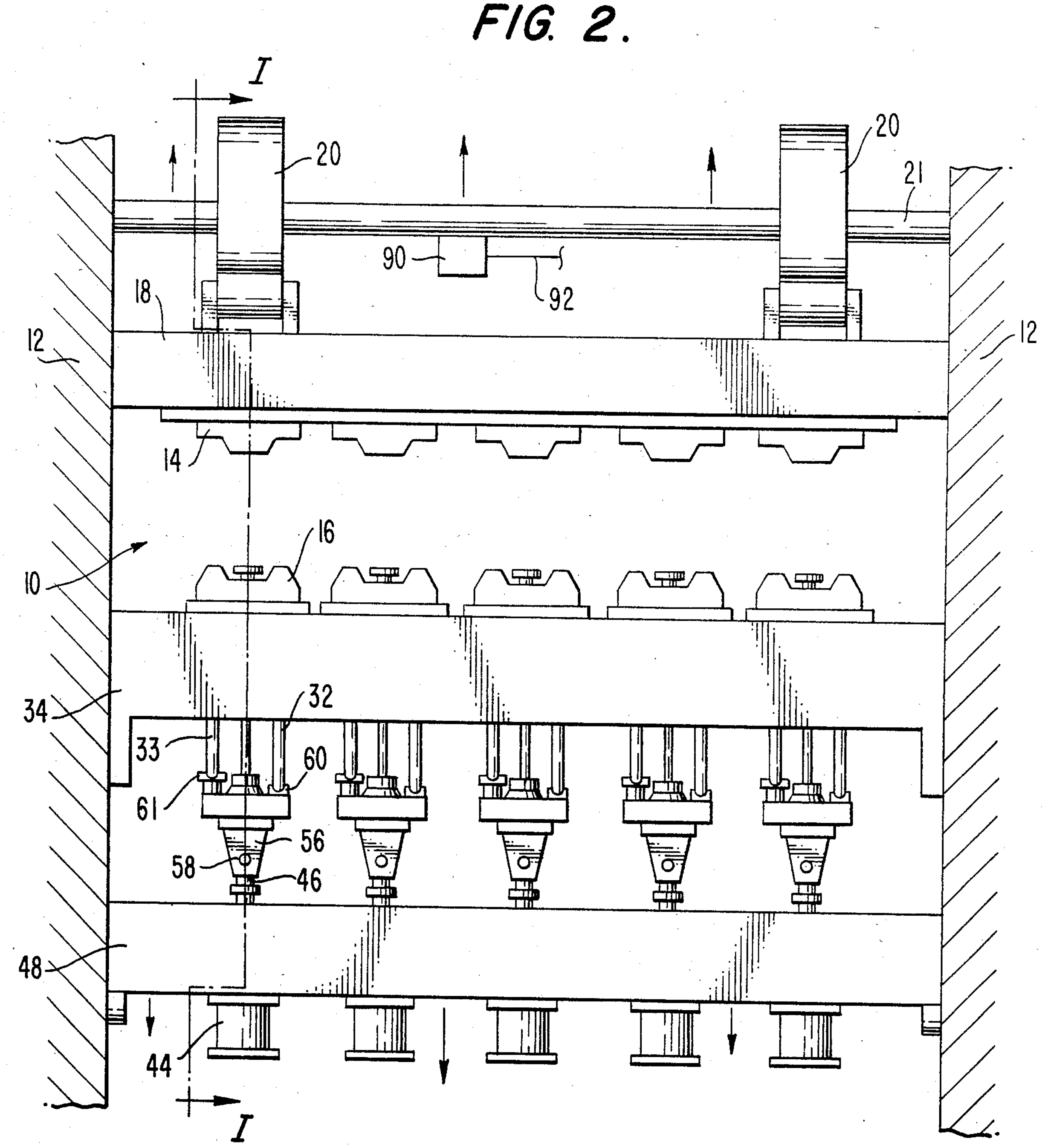
FIG. 2 is a front elevation of the press of the invention in a multiple across configuration.

As embodied and depicted in FIGS. 1 and 2, the press 10 includes frame 12 and first die 14 complementary with second die 16. While first die 14 is depicted as the male die and second die 16 the female die, they may be reversed depending upon product requirements.

In the embodiment, the cam means comprises ram 18 supported by frame 12 for axial movement. Ram 18 carries first die 14 and is reciprocally moved along its axis by the action of cam 20. Rotation of cam 20 axially moves ram 18 and first die 14 between a first position where first die 14 is axially spaced from second die 16 and a second position where first die 14 and second die 16 are fully mated. Cam 20 includes a portion 22 thereof which defines a dwell period when first die 14 is in its second position fully mated with second die 16.

In accordance with the invention, the press includes means for limiting the movement of the other surface. In the preferred embodiment of the invention, the limiting means comprises bolster means supporting the second die for axial movement between upper and lower limits, the bolster means being axially displaced from the upper limit by movement of the first die to its second position. In the embodiment depicted in FIGS. 1 and 2, the bolster means comprises bolster plate 30 supporting second die 16 on one surface thereof and a plurality of pressure pins 32 secured to and axially depending from the other surface of bolster plate 30. Preferably, bolster plate 30 is supported within housing 34 for axial movement, housing 34 being supported by frame 12. Housing 34 includes shoulders 36 defining the lower limit for axial movement of bolster plate 30 and plate locators 38 defining the upper limit of axial movement of bolster plate 30. Housing 34 may include axial bores for guiding axial movement of pressure pins 32, in the preferred embodiment, housing 34 fixedly supports pin guide 40 including axial bores 42 for guidably receiving pressure pins 32.

In accordance with the invention, the press includes means for biasing the other surface toward the one surface under a predetermined force. In the preferred embodiment, the biasing means includes hydraulically acutated power means responsive to the position of the cam means for normally biasing the bolster means toward the upper limit under a first hydraulic pressure and for biasing the bolster means toward the upper limit under a second hydraulic pressure during the dwell period, the second hydraulic pressure being greater than the first hydraulic pressure.

As embodied herein, the power means comprises a hydraulic cylinder 44 including a cylinder rod 46 which is responsive to hydraulic pressures. Hydraulic cylinder 44 is fixed to and supported by beam 48 which is fixed to frame 12. Beam 48 includes a bore 50 for slidably receiving cylinder rod 46.

Preferably, the power means further comprises means for transmitting the pressure imposed on the cylinder rod to the pressure pins and means for compensating for misalignment between the cylinder rod and the pressure pins. As depicted in FIG. 1, the transmitting means comprises yoke 52 attached at one side thereof to the projecting end of cylinder rod 46 for axial movement with cylinder rod 46. Yoke 52 engages at the other side thereof, pressure pins 42.

The compensating means comprises a spherical rod end 54 on the end of cylinder rod 46 engaging the one side of yoke 52 providing limited relative displacement between yoke 52 and cylinder rod 46 in the plane of FIG. 1. The compensating means further comprises a clevis bracket 56 and pivot pin 58 for pivotally attaching the end of cylinder rod 46 to the one side of yoke 52 and for providing for limited relative movement between cylinder rod 46 and yoke 52 in a plane normal to FIG. 1. In addition, the compensating means includes a plurality of inserts 60 disposed on the other side of yoke 52, each insert having a concave depression 62 cooperating with a complementary convex end of a respective one of the pressure pins 32. The cooperating concave depressions and convex pressure pin ends provide for limited misalignment between yoke 52 and pressure pins 32.

Preferably bolster plate 30 is generally rectangular and includes four spaced pressure pins, one secured to the other surface of bolster plate 30 proximate each corner thereof. In the prefered embodiment, one pressure pin 33 is intentionally shorter than the other three pressure pins 32, and is disposed to engage an axially adjustable insert 61. Use of the axially adjustable insert 61 permits adjustment to ensure relative parallel relation between yoke 52 and bolster plate 30 for even application of pressure to bolster plate 30 through pressure pins 32, 33.

The biasing means may comprise a low pressure power means for normally biasing the other surface toward the one surface under a force at least sufficient to overcome gravity acting on the other surface and its support structure, and a high pressure power means responsive to the position of the one surface for applying a predetermined force on the other surface in opposition to the pressing force acting on the one surface. The low pressure power means may be hydraulic, pneumatic or a spring force, and need only be controlled within certain limits since the low pressure is insignificant compared to the high pressure.

Figure 4:
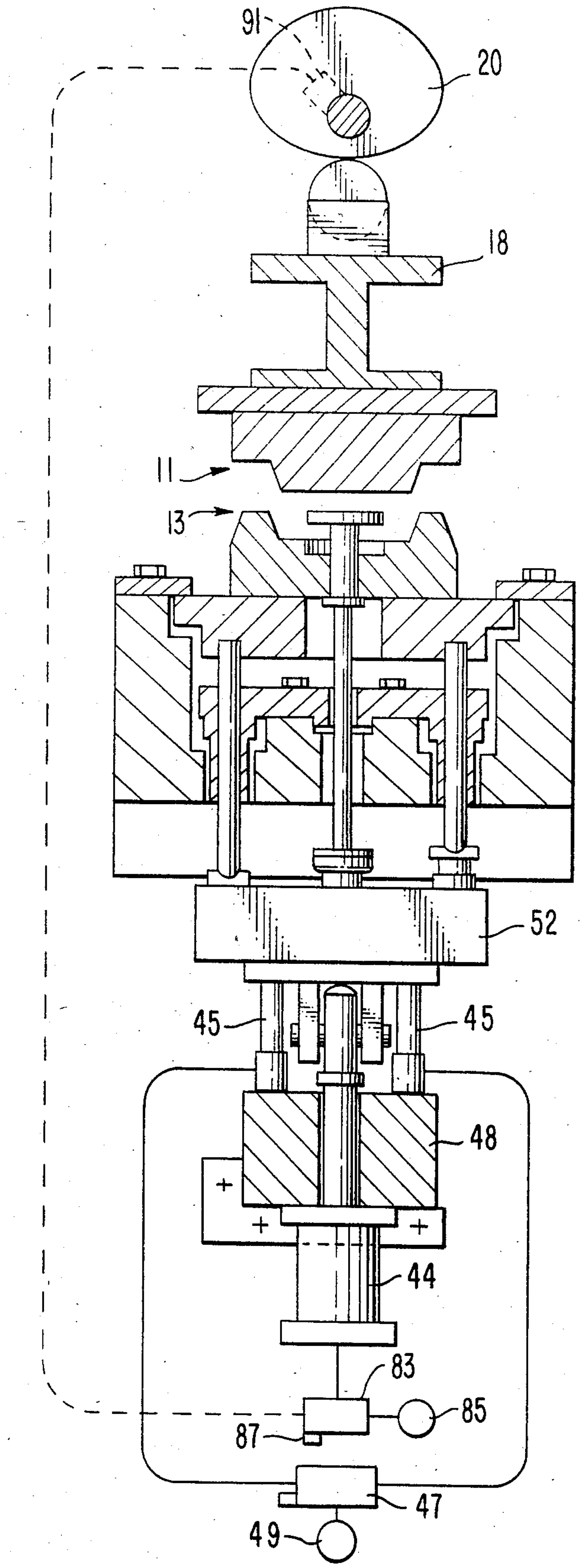
FIG. 4 is a cross-sectcional view similar to that of FIG. 1 of another embodiment of the invention.

In the embodiment depicted in FIG. 4, the biasing means comprises a hydraulic cylinder operatively engaging the other surface and means responsive to air pressure for normally biasing the other surface toward the one surface at a first pressure. In addition to hydraulic cylinder 44, the biasing means includes pneumatic pressure devices 45 disposed between beam 48 and yoke 52. Preferably, devices 45 are in communication with control unit 47 receiving air under pressure from pump 49. The control unit 47 includes known means for adjusting the level of air pressure from pump 49 to the desired first pressure under which devices 45 will normally bias yoke 52 and other surface 13 toward the one surface 11. Preferably, the first pressure generated by devices 45 is less than the pressing force imposed on other surface 13 by the ram 18 and cam 20.

Figure 3:
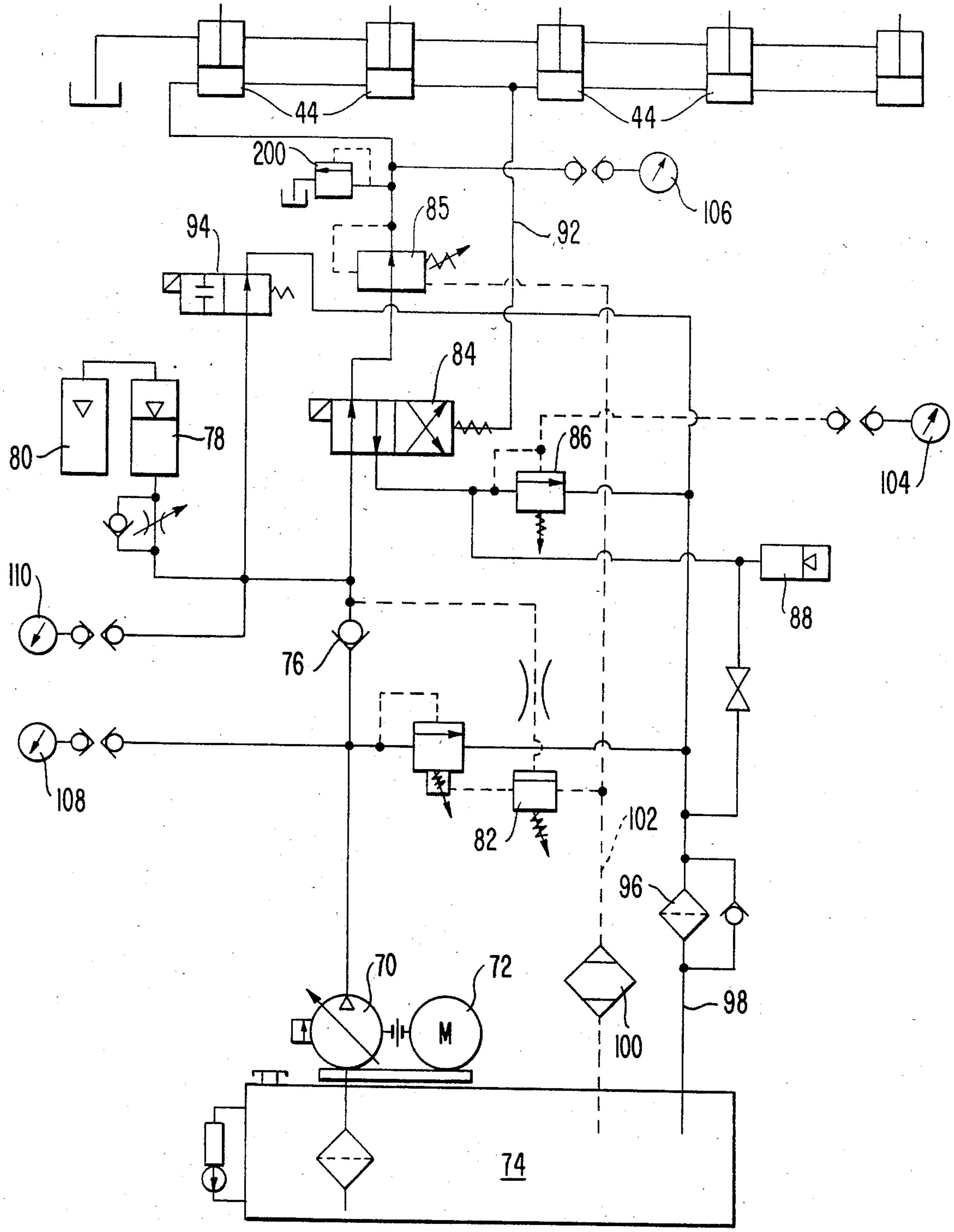
FIG. 3 is a hydraulic schematic showing an embodiment of the hydraulic power system component of the invention.

In accordance with the invention, the press includes means for cyclically changing the magnitude of the predetermined force between controlled predetermined levels during each cycle of the moving means. In the preferred embodiment, the power means includes the changing means which comprises control means responsive to the position of the cam means for normally conveying hydraulic fluid at the first pressure to the hydraulic cylinder and for conveying hydraulic fluid at the second pressure to the hydraulic cylinders during the dwell period. Referring to FIG. 3, the control means comprises hydraulic pump 70 driven by motor 72 for pumping hydrualic fliud from reservoir 74 to provide a source of high pressure hydraulic fluid. The pressurized hydraulic fluid passes through check valve 76 and charges accumulator 78 to the high pressure setting of unloading valve 82. Once the pressure in accumulator 78 achieves the preselected high pressure, accumulator 78 provides system pressure until the accumulator pressure decreases by 25% of its initial pressure at which point fluid flow from pump 70 is directed through valve 76 to repressurize accumulator 78.

The control means includes an electrically operated directional valve means for selectively conveying first a second pressure to the hydraulic cylinder.

As depicted in FIG. 3, the valve means is solenoid operated directional valve 84 which functions to shift between the lower first pressure and the higher second pressure. Where valve 84 is energized, it conveys system pressure to reducing valve 85 which is selectively set to limit pressure conveyed to the hydraulic cylinders 44 to the selected second pressure. The pressure reducing valve 85 may be adjusted in order to easily change the level of second pressure conveyed to cylinders 44.

When directional valve 84 is deenergized, it shifts to the low pressure mode by which hydraulic fluid is conducted to low pressure relief valve 86 and low pressure accumulator 88. Relief valve 86 is selectively set to a predetermined pressure determined to be low enough as to avoid overloading the drive mechanism of the press, but high enough to bias bolster plate 30 against its axial upper limit defined by locators 38. The low pressure fluid is stored in accumulator 88 which provides low pressure through directional valve 84 to hydraulic cylinders 44. As pressure reducing valve 85 defines the higher second pressure, the lower first pressure generated by accumulator 88 is not affected by valve 85.

In the embodiment, the control means also comprises means for sensing the position of the cam means and for operating the directional valve 84 to convey second pressure to cylinder 44 when the cam means is in the dwell period. As diagramatically depicted in FIG. 2, a known sensor 90 is used to sense the position of the shaft driving cams 20 and to generate an electrical signal when cams 20 are in the dwell period. This signal is conveyed along electrical conduit 92 to directional valve 84. Thus, when cam 20 is in the dwell period, an electrical signal is sent to directional valve 84 energizing the valve to shift to convey high system pressure through reducing valve 85 which sets the second pressure for acting on cylinders 44 during the dwell period. Sensor 90 is preferably arranged to deenergize directional valve 84 slightly before the end of the dwell period thereby allowing the control system to shift to the lower first pressure as the cam rotates out of the dwell period. This eliminates the resistance torque component which would cause an overload to the drive system of the press.

As depicted in FIG. 3, the hydraulic system further includes a solenoid operated dump valve 94 used to expel all hydraulic fluid from the accumulators when pump 70 stops. This is a safety feature to prevent high pressure fliud from remaining in the system when it is shut down. In order to protect the machine from failure of pressure reducing valve 85, relief valve 200 is provided in the cylinder line circuit. Valve 200 is selectively set slightly above working pressure but below the pressure at which damage to the press would occur.

The system also includes a filter 96 in return line 98 and an air cooled heat exchanger 100 in pilot drain line 102. Gauge 104 provides a reading of low cylinder or first pressure, gauge 106 provides a reading of high cylinder or second pressure, gauge 108 provides a reading of pump pressure, and gauge 110 indicates the pressure of accumulator 78.

In the second embodiment as depicted in FIG. 4, the changing means comprises a control means 83 in communication with a hydraulic fluid pump 85 for conveying hyraulic fluid to cylinder 44 at a second pressure. Control means 83 is responsive to a sensor 91 indicating the position of the one surface 11 such that the second pressure hydraulic fluid is only communicated to cylinder 44 when working surfaces 11, 13 are in pressing contact. Control means 83 includes means 87 for adjusting the second pressure to a predetermined desired level.

In operation, in the preferred embodiment, depicted in FIG. 1, the other surface 13 constituting second die 16 is normally biased by hydraulic pressure admitted to cylinder 44 under a first pressure. The first pressure is communicated through yoke 52 and pressure pins 32, 33 to press bolster plate 30 against the upper stops 38. A piece of sheet material 112 is disposed between the working surfaces 11, 13 and rotation of cam 20 moves the one surface 11 constituting first die 14 axially toward second die 16. The first pressure is constant and maintained on bolster plate 30 until dies 14 and 16 are fully mated. The cam mechanism imposes a pressing force between dies 14 and 16 which biases bolster plate 30 axially away from upper limit or stops 38. The first force or pressure from cylinder 44 is less than the pressing force generated by cam 20.

When dies 14, 16 are fully mated, cam 20 enters the dwell period defined by surface 22. This is communicated to the hydraulic circuit depicted in FIG. 3 which shifts to send the higher second pressure to cylinder 44. Since bolster plate 30 has been axially displaced from the upper limit defined by stops 38, the second pressure acts directly between dies 14, 16 in axial opposition to the pressing force from cam 20.

Where a paper container is being formed from the blank 112, the lower first pressure biasing bolster 30 against upper limit 38 is merely sufficient to keep dies 14 and 16 in proximity such that axial movement of die 14 into mating relationship with die 16 will shape the desired container from blank 112 without applying undue pressure. After blank 112 has been fully shaped and dies 14, 16 are fully mated, then the greater second pressure is applied to form or press the shaped blank into the desired product.

The invention further contemplates a press incorporating a plurality of pairs of first and second complementary dies as depicted in FIG. 2. In this embodiment of the invention, the ram means 18 is supported by frame 12 for axial movement and carries a plurality of first dies 14 for movement together. Cams 20 are driven by shaft 21 and are rotatably supported within frame 12 for reciprocally moving ram 18 between a first position where the pairs of first and second dies are spaced and a second position where the pairs of first and second dies are mated. The cam means includes the dwell period when the ram means is in the second position. Each second die is supported by an independent bolster which in turn is supported within frame 12 by housing 34 for independent axial movement between upper and lower limits. Each second die 16 and bolster 30 has its own hydraulic power means as described above with respect to the embodiment depicted in FIG. 1 which is responsive to the cam means for normally biasing the bolster toward its upper limit under a predetermined first hydraulic pressure and for biasing each bolster towards its upper limit under a predetermined second hydraulic pressure during the dwell period. The second hydraulic pressure is greater than the first pressure. As seen in FIG. 3, the plurality of cylinders 44 may be arranged in series on a hydrualic line from the control system, although other means of connecting the cylinders to the control system are possible.

Figure 5:
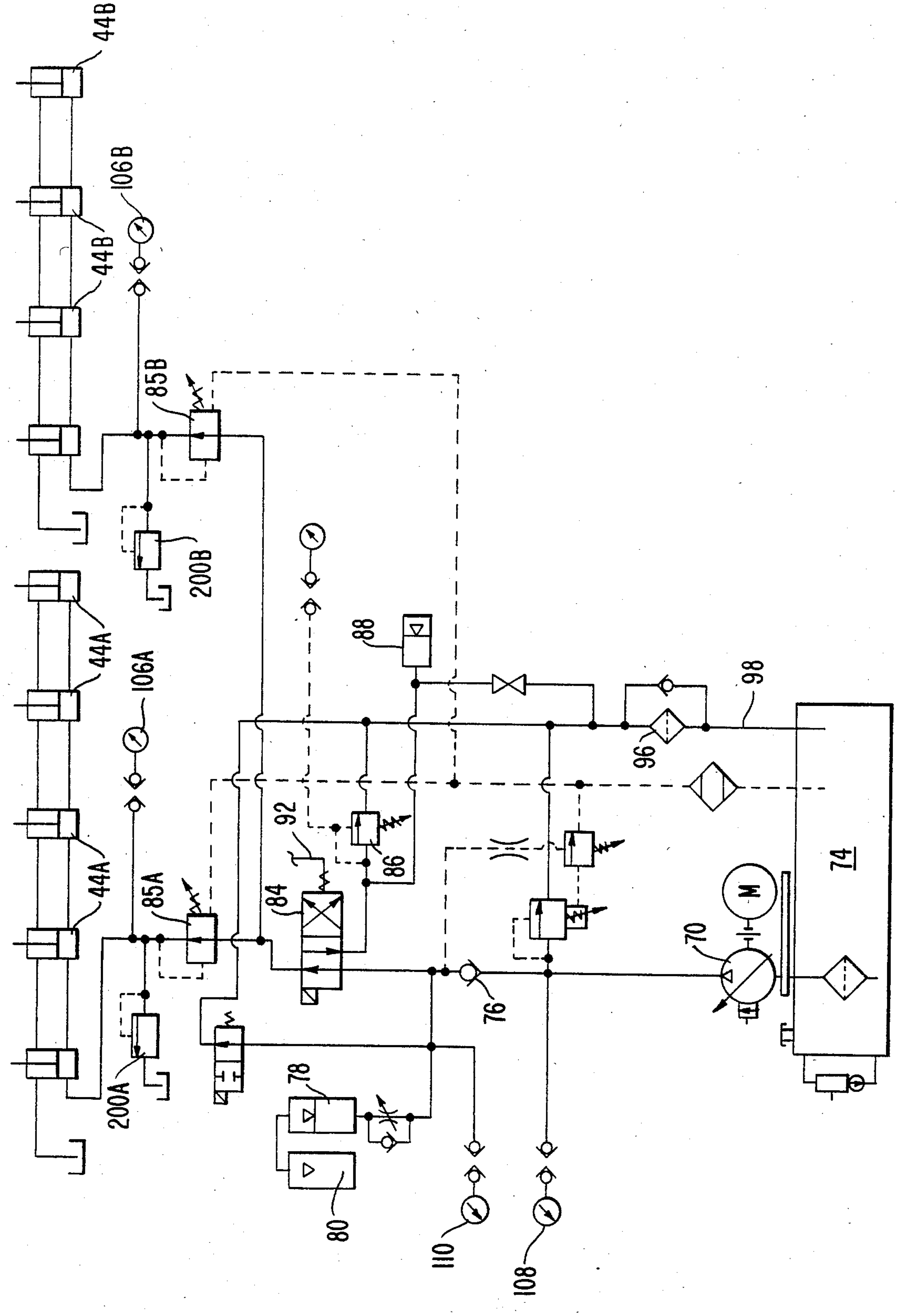
FIG. 5 is a hydraulic schematic showing another embodiment of the hydraulic power system component of the invention.

In another embodiment, generally depicted in FIG. 5, the invention contemplates a multiple across press arrangement wherein certain of the pairs of opposed working surfaces or dies 44A perform one desired pressing function and other dies 44B in the same press perform another desired pressing function. Since these different pressing functions require different pressure requirements, separate control circuits are provided for controlling the second pressures constituting the counter force acting on the second surface. Any number of means for conveying different pressures to different pairs of dies in the same press may be possible. One possibility is depicted in FIG. 5 wherein the hydraulic system of FIG. 3 is modified by adding a second pressure reducing valve 85B and associated relief valve 200B and gauge 106B to provide a separate high pressure control for dies 44B.

The use of multiple dies for simultaneously manufacturing different products provides the ability to more efficiently use blanks disposed within the press, particularly where the blanks are web blanks rather than individual blanks. For examle, large paper plates may be manufactured in the press and the unpressed portion of the web between each plate may be used to manufacture small bowls. This substantially reduces waste.

The invention further includes means for compensating for press deflection. When the opposed surfaces are in pressing contact, the press force is in direct opposition to the counter force at a higher second pressure. Unless the press is uneconomically made substantially stronger than most normal presses, these opposed forces will cause a certain degree of press deflection. In multiple across arrangements, such press deflection varies from one pair of working surfaces to the next depending on their proximity to supporting structural members such as the sidewalls of the frame. In prior art presses, it is virtually impossible to measure and compensate for press deflection because of the varying spring constants and the difficulty in using insensitive bolster springs which are not infinitely adjustable to compensate for different minor press deflections. Where the press deflections are not compensated for, the pressure imposed between the cooperating surfaces varies resulting in products of varying quality.

Accordingly, the invention provides a means for insuring that the pressure between the opposed surfaces is constant throughout the press despite varying press deflections. This is achieved by providing hydraulic cylinders 44 having a stroke length which is greater than that necessary to abut the bolster plates 30 against their upper limits 38. For example, the high pressure used in forming paperboard containers may cause total deflections in load bearing members of between 0.032 to 0.093 inches depending on the pressure used. To compensate for this deflection, the hydraulic cylinders have a work stroke of one inch and are located such that when bolster plates 30 abut locators 38, the cylinders are operating at mid-stroke. This provides a 0.5 inch compensation for deflection and wear of machine members.

The invention further contemplates a method of forming a shaped article from sheet material comprising the steps of providing a first die 14 for reciprocal axial movement between first and second positions and providing a second die 16 complementary and axially opposed to the first die for axial movement between upper and lower limits. The method includes applying a first predetermined hydrualic pressure to the second die 16 to bias second die 16 toward the upper limit defined by locator 38 on housing 34 which engage bolster 30. Under the method, sheet material 112 is disposed between the first and second dies 14, 16. First die 14 is axially moved from a first position spaced from the second die 16 to a second position mated with second die 16 by the force of cam 20. The force of cam 20 is sufficient to axially move second die 16 and its supporting bolster plate 30 from the upper axial limit defined by locators 38 when first die 14 achieves its fully mated second position. The surface 22 of cam 20 defines a dwell period maintaining first die in the second position for a predetermined period. The control system depicted in FIG. 3 senses that cam 20 is in the dwell period and applies the second predetermined hydrualic pressure through hydraulic cylinder 44 to bolster plate 30 and second die 16 to bias second die 16 toward its upper limit. The second pressure is greater than the first pressure. As axial movement of first die 14 in its second position is limited mechanically by the position of cam 20 acting on ram 18 and bolster plate 30 is axially spaced from locators 38, the second pressure imposed during the dwell period acts on sheet material 112 which has been shaped by the initial movement of first die 14 to its second position. The higher second pressure serves to form an article as defined by the complementary shapes of dies 14, 16. As the higher pressure is imposed between dies 14, 16 during the dwell period of cam 20, the higher pressure does not overload the drive system.

The method further includes axially moving first die from the second position to the first position by movement of cam 20 out of the dwell period and removing the second higher hydrualic pressure from and applying the first hydraulic pressure to the second die. Preferably, the shift from the second pressure to the lower first pressure is effected just before cam 20 moves out of the dwell period. The final step in the method of the invention is removing the shaped article from the press.

It will be apparent to those skilled in the art that various modifications and variations can be made to the press of the invention without departing from the scope or spirit of the invention.

What is claimed is:

1. A press for forming sheet material into a shaped article, said press comprising;

(a) a frame;

(b) first and second complementary dies;

(c) cam means supported by said frame for reciprocally moving said first die along an axis between a first position axially spaced from said second die and a second position fully mated with said second die, said cam means including a dwell period when said first die is in said second position;

(d) bolster means supporting said second die for axial movement between upper and lower limits, said bolster means being axially displaceable from said upper limit by movement of said first die to its second position;

(e) hydraulically actuated power means for biasing said bolster means towards said upper limit;

(f) control means responsive to the position of said cam means for normally conducting hydraulic fluid to said power means under a first pressure and for conducting hydraulic fluid to said power means under a second pressure during said dwell period, said second pressure being greater than said first pressure; and (g) means for selectively adjusting the magnitude of said first and second pressures.

2. The press of claim 1 wherein said bolster means comprises a bolster plate supporting said second die on one surface thereof and including a plurality of pressure pins secured to and axially depending from the other surface of said bolster plate.

3. The press of claim 2 also including a housing fixed to said frame, said housing supporting said bolster plate for axial movement and including stops defining said upper and lower limits, said housing having axial bores for guiding axial movement of said pressure pins.

4. The press of claim 2 wherein said power means includes:

(a) a hydraulic cylinder including a cylinder rod responsive to said first and second hydraulic pressures;

(b) means for transmitting the pressure imposed on said rod to said pressure pins; and (c) means for compensating for misalignment between said cylinder rod and said pressure pins.

5. The press of claim 4 wherein said transmitting means comprises a yoke attached at one side thereof to said cylinder rod for axial movement therewith and engaging at the other side thereof said pressure pins.

6. The press of claim 5 wherein said misalignment compensating means comprises a spherical rod end on the end of said cylinder rod engaging the one side of said yoke, a clevis bracket and pivot pin pivotally attaching said cylinder rod to the one side of said yoke, and a plurality of concave depressions disposed on the other side of said yoke for cooperating with complementary convex ends of said pressure pins.

7. The press of claim 6 wherein said bolster plate includes four spaced pressure pins, one said pressure pin being axially shorter than the other three and wherein one said concave depression is axially adjustable to engage the end of said shorter pressure pin to ensure even application of pressure to said bolster plate.

8. The press of claim 1 wherein said control means comprises:

(a) a source of pressurized hydraulic fluid;

(b) first means for selectively limiting the pressure of said hydraulic fluid to said first pressure;

(c) second means for selectively limiting the pressure of said hydraulic fluid to said second pressure;

(d) electrically operated directional valve means for conveying said first or second pressure to said hydraulic cylinder; and (e) means for sensing the position of said cam means and for operating said valve means to convey said second pressure to said hydraulic cylinder when said cam means is in said dwell period.

9. A press for forming a plurality of shaped articles from sheet material, said press comprising:

(a) a frame;

(b) a plurality of pairs of first and second complementary dies, each said pair cooperating to form one said article;

(c) ram means supported by said frame for axial movement, said ram means carrying a plurality of said first dies for movement together;

(d) cam means for reciprocally moving said ram means between a first position where said pairs of first and second dies are spaced and a second position where said pairs of first and second dies are mated, said cam means including a dwell period when said ram means is in said second position;

(e) bolster means supporting each said second die for independent axial movement between upper and lower limits, each said bolster means being axially spaced from its upper limit when said ram means is in said said second position;

(f) low pressure power means for normally biasing each said bolster means toward its upper limit under a predetermined first pressure; and (g) high pressure power means responsive to said cam means for biasing each said bolster means towards its upper limit under a predetermined second hydraulic pressure during said dwell period, said second pressure being greater than said first pressure.

10. A method of forming a shaped article for sheet material, said method comprising:

(a) providing a first die for reciprocal axial movement between first and second positions;

(b) providing a second die, complementary and axially opposed to said first die for axial movement between upper and lower limits;

(c) normally applying a first predetermined pressure to said second die to bias said second die towards said upper limits;

(d) disposing said sheet material between said first and second dies;

(e) axially moving said first die from said first position spaced from said second die to said second position mated with said second die by a force sufficient to axially move said second die from its upper limit when said first die achieves its second position;

(f) maintaining said first die in said second position for a predetermined period;

(g) while said first die is in said second position, applying a second predetermined hydraulic pressure to said second die to bias said second die toward said upper limit, said second pressure being greater than said first pressure;

(h) removing said second predetermined pressure and axially moving said first die from said second position to said first position; and (i) removing said shaped article.

11. A press for shaping a workpiece into an article said press comprising:

(a) first and second axially opposed dies cooperatively disposed to press said workpiece each said die being disposed for movement on an axial path between respective upper and lower limits, the lower limit of said first die being below the upper limit of said second die, said dies at their respective upper limits being axially spaced a distance sufficient to permit placement of said workpiece there-between;

(b) means for reciprocally moving said first die between its upper and lower limits, said moving means including means for maintaining said first die proximate its lower limit for a predetermined period;

(c) resistance means biasing said second die under a controlled, predetermined first pressure for yieldingly resisting movement of said first die toward its lower limit, said first pressure being sufficient to shape said workpiece between said dies and to place said dies in full operative engagement proximate the lower limit of said die;

(d) pressing means biasing said second die under a controlled, predetermined second pressure in opposition to said first die during said predetermined period for forming said shaped workpiece between said dies;

(e) means for selectively adjusting the magnitude of said first and second pressures; and (f) control means responsive to said moving means for normally actuating said resistance means and for actuating said pressing means during said predetermined period.

12. The press of claim 11 wherein said said resistance means and said pressing means comprise a hydraulic cylinder operatively engaging said second die.

13. The press of claim 12 wherein said control means comprises means for normally conducting hydraulic fluid to said cylinder at said first pressure and means for increasing the pressure of said fluid to said second pressure during said predetermined period.

14. The press of claim 11 wherein said resistance means comprises pneumatic means operatively engaging said second die for normally biasing said second die and said pressing comprises a hydraulic cylinder operatively engaging said second die.

15. The press of claim 14 wherein said control means comprises means for normally conducting a gas to said pneumatic means at said first pressure and means for conducting hydraulic fluid to said cylinder at said second pressure during said predetermined period.

16. The press of claim 11 wherein said moving means is a cam structure operatively engaging said first die, said cam structure including a dwell defining said predetermined period.

17. The press of claim 13 or 15 wherein said second pressure is applied after said dies are fully engaged and is released just prior to the end of said predetermined period.

18. The press of claim 12 or 14 wherein said first and second dies are operatively supported by a frame structure and wherein said press also includes deflection compensating means for maintaining a constant second pressure between said dies when fully engaged despite reactive deflections of said frame structure.

19. The press of claim 18 wherein said deflection compensating means comprises a stroke length of said hydraulic cylinder greater than necessary to move said second die to its upper limit.

20. A press for shaping a plurality of workpieces into articles, said press comprising:

(a) a frame;

(b) a plurality of pairs of first and second axially opposed dies, each pair being cooperatively disposed to independently press said workpieces, each die of each said pair being disposed for movement on a respective axial path between respective upper and lower limits, the lower limits of said first dies being below the upper limits of said second dies, said dies at their respective upper limits being axially spaced a distance sufficient to permit placement of said workpieces there-between;

(c) means for reciprocally moving said first dies between their respective upper and lower limits, said moving means including means for maintaining said first dies proximate their respective lower limits for a predetermined period;

(d) resistance means independently biasing each said second die under a controlled, predetermined first pressure for yieldingly resisting movement of said first dies toward their lower respective limits, said first pressure being sufficient to shape said workpieces between said respective die pairs and to place said die pairs in full operative engagement proximate the lower limits of said first dies;

(e) pressing means independently biasing each said second die under a controlled predetermined second pressure in opposition to its respective first die during said predetermined period for forming said shaped articles between said respective die pairs;

(f) means for selectively adjusting the magnitude of said first and second pressures; and (g) control means responsive to said moving means for normally actuating each said resistance means and for actuating each said pressing means during said predetermined period.

21. The press of claim 20 wherein said resistance means and said pressing means for each said die pair comprises a separate hydraulic cylinder operatively engaging the repsective second die.

22. The press of claim 21 wherein said control means comprises means for normally conducting hydraulic fluid to each said hydraulic cylinder at said first pressure and means for increasing the pressure of said hydraulic fluid to said second pressure during said predetermined period.

23. The press of claim 20 wherein said moving means is a cam structure simultaneously operatively engaging a plurality of said first dies, said cam structure including a dwell defining said predetermined period.

24. The press of claim 21 wherein each said hydraulic cylinder has a stroke length greater than necessary to move its respective second die to its respective upper limit such that a constant second pressure is maintained between respective die pairs during said predetermined period despite reactive deflections of said frame.

25. In a press for simultaneously forming a plurality of shaped articles from a blank of sheet material, said press including a frame supporting a plurality of pairs of axially opposed first and second dies, each said first die being axially moveable between a first position spaced from and a second position fully mated with its respective second die, the press also including means for simultaneously cyclicly moving a plurality of said first dies between their first and second positions and for maintaining said first dies in said second positions for a predetermined period, the improvement comprising:

(a) means for separately supporting each said second die in said frame for independent axial movement between upper and lower limits;

(b) means for generating a uniform force between the first and second dies of each said pair, said generating means including;

(1) a plurality of hydraulic cylinders, one of said cylinders operatively engaging each said second die to bias said second die toward it respective first die; and (2) control means responsive to said moving means for normally conducting hydraulic fluid at a first pressure to each said cylinder and for conducting hydraulic fluid at a greater, second pressure to each said cylinder only during said predetermined period; and (c) means for selectively adjusting the magnitude of said first and second pressures.

26. The press of claim 25 also including means for maintaining a constant force between the first and second dies of each said pair during said predetermined period despite reactive deflections of said frame, said maintaining means comprising a stroke length of each said hydraulic cylinder greater than necessary to place the respective second die at its respective upper limit.

* * * * *